Sept. 24, 1968  B. J. PANEK ET AL  3,402,541
FLAIL KNIFE ASSEMBLY
Filed July 21, 1965  3 Sheets-Sheet 2
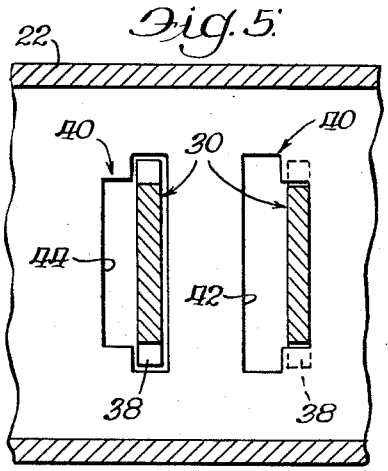
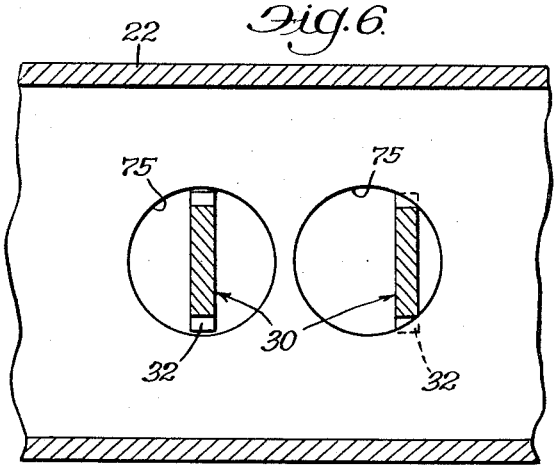
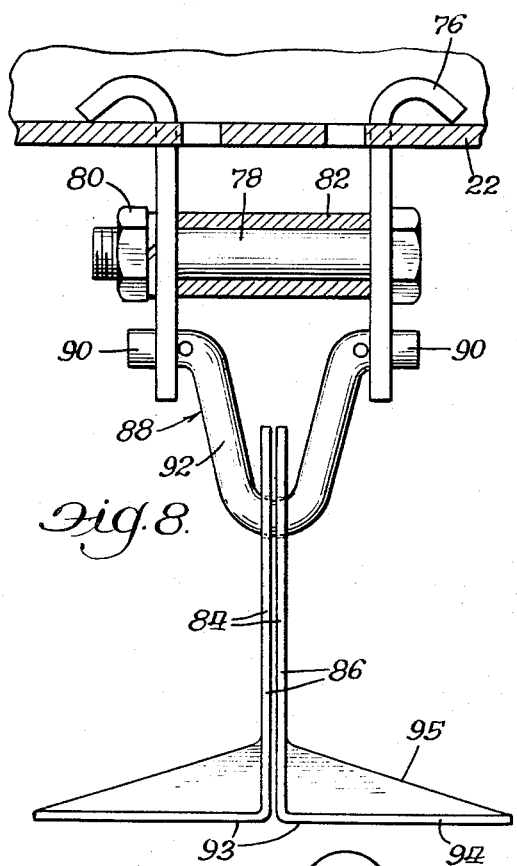
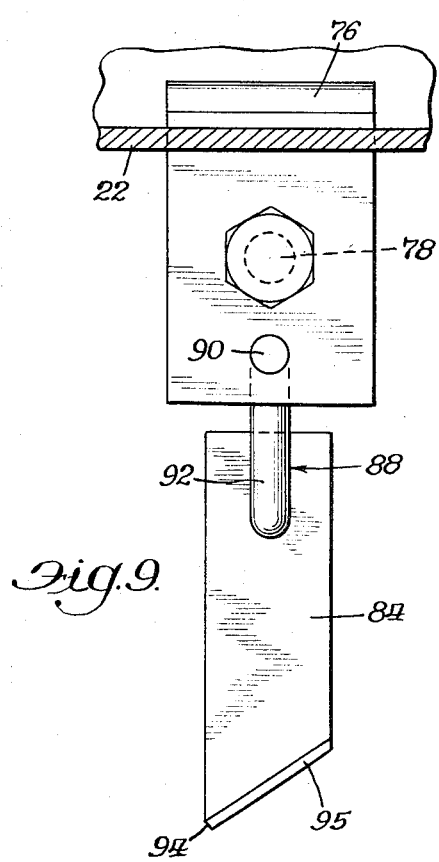
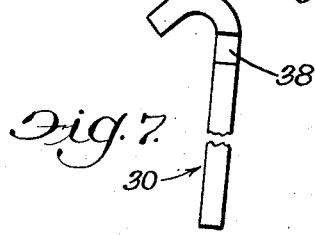
Inventors:
Bruno J. Panek
Robert W. Woodring
John J. Kowalik
Atty.

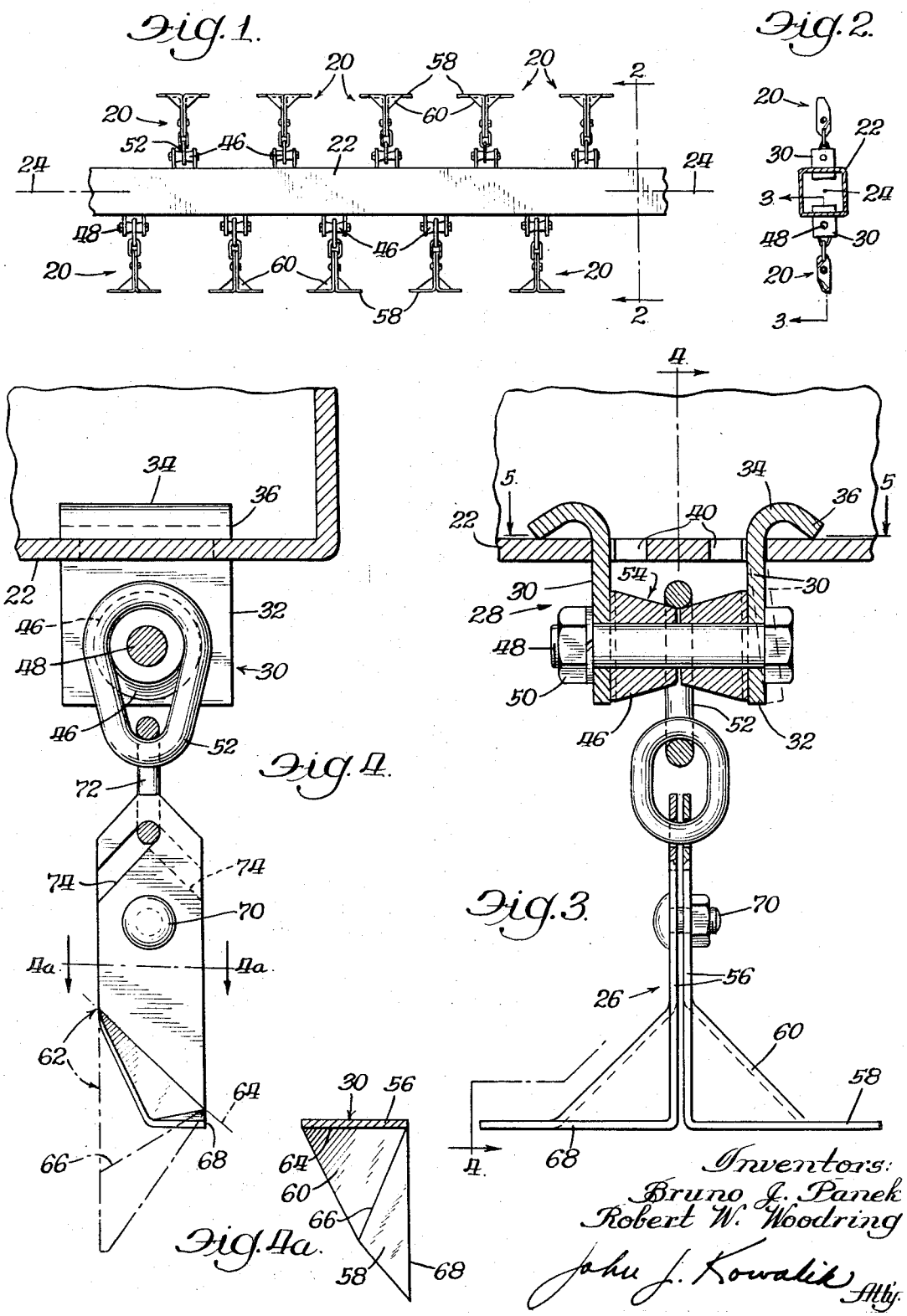

Sept. 24, 1968     B. J. PANEK ET AL     3,402,541
FLAIL KNIFE ASSEMBLY
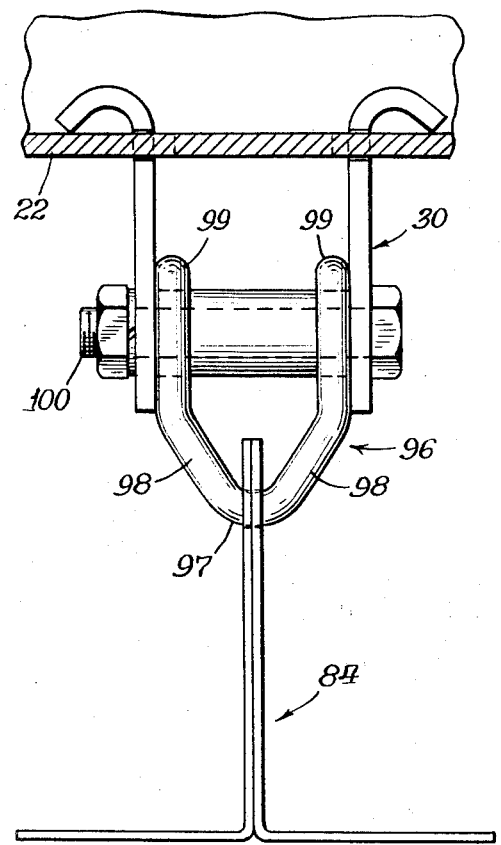
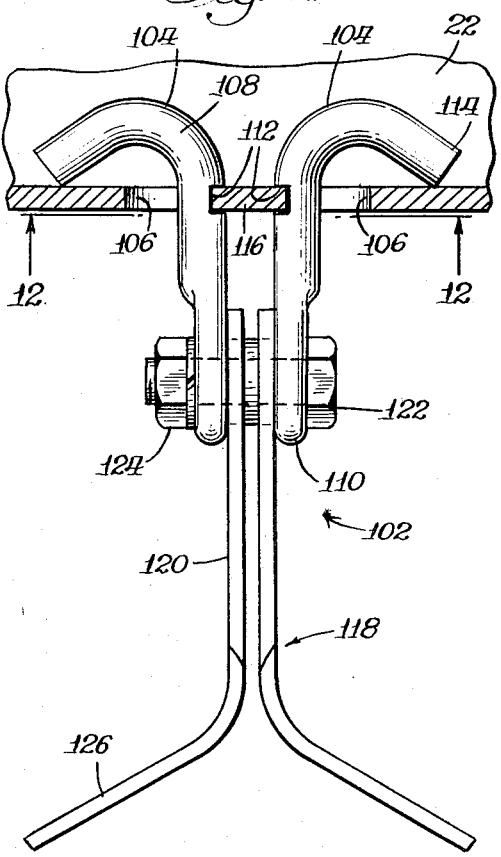
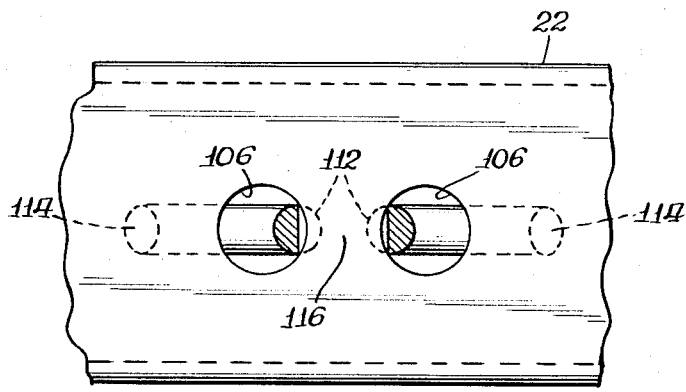
Inventors:
Bruno J. Panek
Robert W. Woodring
John J. Kowalik
Atty.

United States Patent Office 3,402,541
Patented Sept. 24, 1968

3,402,541
FLAIL KNIFE ASSEMBLY
Bruno J. Panek, Chicago, and Robert W. Woodring, La Grange, Ill., assignors to International Harvester Company, Chicago, Ill., a corporation of Delaware
Filed July 21, 1965, Ser. No. 473,661
9 Claims. (Cl. 56—294)

ABSTRACT OF THE DISCLOSURE

A flail knife assembly having clips secured to the rotor shaft and knife centering and positioning structure for holding the knives in free swinging position.

The present invention relates to a flail knife assembly, and more particularly such an assembly for mowers and other forage choppers and harvesters.

The invention has to do with a flail knife assembly for that kind of mower having a knife holder in the form of a shaft rotating on an axis transverse to the direction of movement of the mower. The knife assemblies are in the form of flails, being pivoted near one end on the holder and upon rotation of the holder the outer ends of the knives fly out to generally radial position.

Each knife assembly includes a pair of knives and means for mounting the knives on the holder, the knives being pivotally supported or suspended on the holder.

A broad object of the invention is to provide a novel means for pivotally mounting knives in a flail knife assembly of the foregoing character.

Another object of the invention is to provide in a flail knife assembly, novel mounting means of simple and rigid construction for mounting knives on a holder.

Still another object is to provide in a flail knife assembly, means for mounting the knives on a holder, having novel construction operative for self-centering the knives in the mounting means.

A further object is to provide a flail knife assembly of the foregoing general character including knives of novel construction effective for performing a self-cleaning function, eliminating the accumulation and snagging of particles or shreds of the plants being mowed.

Still another object is to provide a flail knife assembly having knives of novel construction operative for producing an air stream of large volume for carrying the mowed plants therein through ducts in the apparatus designed for that purpose, to a receptacle such as a wagon or truck.

Other objects and advantages of the invention will appear from the following detail description taken in conjunction with the accompanying drawings in which FIGURE 1 is a side view, in small scale, of a portion of a holder on which a plurality of flail knife assemblies are mounted, and showing certain of such assemblies thereon;

FIGURE 2 is a view taken from line 2—2 of FIGURE 1;

FIGURE 3 is a large scale sectional view of the knife assembly of FIGURES 1 and 2, taken on line 3—3 of FIGURE 2 and thus oriented according to FIGURE 1;

FIGURE 4 is an end view taken from the left of FIGURE 3;

FIGURE 4a is a view taken at line 4—4 of FIGURE 4;

FIGURE 5 is a view taken at line 5—5 of FIGURE 3 but showing one of the clips in an alternate position;

FIGURE 6 is a view similar to FIGURE 5 but showing a slightly modified form of mounting arrangement;

FIGURE 7 is a side edge view of one of the clips utilized in the construction of FIGURE 3;

FIGURE 8 is a view of a modified form of the invention oriented according to FIGURE 3.

FIGURE 9 is a view taken from the right of FIGURE 8;

FIGURE 10 is a view showing a form slightly modified relative to FIGURE 8, and oriented according to the latter figure;

FIGURE 11 is a view oriented according to FIGURES 3 and 8 and showing another form of mounting means; and FIGURE 12 is a view taken at line 12—12 of FIGURE 11.

Referring now in detail to the drawings attention is directed first to FIGURES 1 and to 6 illustrating the first embodiment of the invention. A knife assembly is indicated in its entirety at 20 and is mounted on a holder 22 which is in the form of a shaft. This shaft may be of any desired cross sectional shape, such as square as in the present instance and is preferably tubular. It is mounted in the mower or apparatus for rotation on an axis transverse to the direction of travel of the mower. Such axis is indicated by the dot-dash line 24 in FIGURE 1. The knife assembly includes a pair of knives 26 swingably supported in mounting means 28 mounted on the holder 22. The mounting means 28 includes a pair of identical clips 30 of spring steel, each including a long leg 32 and an arcuate or bowed portion 34 forming a generally hook shaped end of the clip and terminating in a short leg 36. Notches 38 are formed in opposite edges of the long leg 32 adjacent the arcuate portion 34. The clips in one form of the invention are fitted in keyed slots or apertures 40 (FIGURE 5) each having a wide portion 42 and a narrow portion 44. The clips are fitted in position by inserting the short legs 36 through the wide portions of the apertures, the latter being dimensioned for receiving them, and moved therein until the notches 38 register with the narrow portions 44 and then moved outwardly away from each other. Spools 46 each frusto-conical in shape with their small ends butted to each other are fitted on a bolt 48 positioned in apertures in the outer extended ends of the long legs 32 of the clips. A nut 50 is threaded on the bolt for drawing up the outer ends of the clips toward each other, the spools limiting the inward movement of the clips.

Mounting means generally similar to the foregoing is disclosed in our copending application, Ser. No. 399,586, filed Sept. 28, 1964 now Patent No. 3,292,353, for Flail Mower Structure, but the present mounting means possesses advantages thereover. The arcuate or bowed portions 34 of the clips are of such size and shape, and the notches 38 are so located, that the arcuate portions produce an inward bias of the clips, i.e., the terminal portions 36 bear against the inner surface of the wall, and the notches in the clips work against the marginal edge of the apertures, tending to hold the long legs 32 outwardly away from each other, as shown in dotted lines in FIGURE 3. As the nut 50 is tightened, it draws the outer ends of the legs 32 inwardly, producing a fulcrum at the points 76 between the notches 38 and the wall of the holder. This tends to flatten the arcuate portions 34, and the reaction thereto caused by the resilience of the steel of the clips causes the biasing action mentioned. The clips are of substantial width (FIGURE 4), and this fact together with the biasing effect in the clips mentioned, and the holding effect of the bolt-nut means 48, 50 provides rigid, strong and extremely effective mounting means for the knives.

In the assembly of the foregoing elements of the mounting means a universal link 52 is mounted on the spools, this link serving to directly support or suspend the knives 26 as described hereinbelow. The arrangement of the spools forms a valley 54 working to center the link 52 and thus the knives on the spools.

Each knife 26 includes a shank 56 constituting a mounting portion, a cutting portion 58, and an intermediate portion 60. The portions 58 and 60 as will be seen are out of the plane of the mounting portion 56 and each knife may be shaped or fabricated from a blank indicated at 62 in FIGURE 4. The blank is bent on a line 64 to form the intermediate section 60 and the latter is bent on a line 66 to form the cutting portion 58, although these two bending operations need not be in the order named. The cutting portion 58 has a cutting edge 68 formed thereon, this cutting portion extending generally perpendicular to the shank or mounting portion 56 and inclined to both of the portions 56 and 58. The intermediate portion 60 diverges from the leading edges of the cutting and mounting portions toward the trailing edges thereof (FIGURE 4a). The cutting portion 58 lies in such direction that upon rotation of the holder 22 about the axis 24, and consequent swinging of the knife assembly, the cutting portion lies in or close to the cylinder defined by the outer end of the knives and the intermediate portion 60 is at such angle to the direction of movement of the knives that they create an air blast or stream. The cutting portions 58 after cutting the crop plants produce a throwing or slinging effect, and the intermediate portions 60 develop an intensified air stream or blast and carry the cut plants in the intended direction, such as though a chanel or duct to the intended receptacle such as a wagon or truck.

The intermediate portions 60 also produce a self-cleaning effect, eliminating sagging or accumulation of the crop particles or shreds on the knives. The knives are mounted in back-to-back relation, with the portions 56 in substantially abutting relationship and the cutting portions 58 extending outwardly from each other. A suitable bolt 70 is fitted in apertures in the knives for molding them together. The knives are mounted on a link 72 interlinked with the link 52, the mounting portions 56 thereof having diagonal notches 74 receiving the link 72. The notches are so oriented that when the knives are fitted together they extend downward and away from each other. The knives may be mounted on the link 72 individually and then the bolt 70 applied for securing the knives together. The direction of the notches 74 is such that due to the centrifugal force exerted on the knives, the notches perform a camming action to maintain the inner closed ends of the notches against the link and together with the bolt 70 maintain the knives in longitudinally matched position.

The knives, in the normal operation, tend to assume the position shown in FIGURES 3 and 4, i.e., with the shanks or mounting portions 56 rotating in a plane perpendicular to the axis of rotation of the holder. The relative positions between the various elements including the knives, the links 52 and 72 and the spools 46 tend to maintain the knives in the position mentioned, but there is a degree of yieldability about a longitudinal axis of the blades i.e., and the axis radial to the holder and extending longitudinally of and between the knives. Thus if one or the other of the cutting portions 58 should encounter an obstacle, the knife assembly will be permitted to yield and twist about the radial axis mentioned.

FIGURE 6 shows a modified arrangement for mounting the mounting means 28 on the holder. In the present case a pair of round holes 75 are formed in the wall of the holder 22, as by drilling, drilling being a less expensive operation than that forming the apertures 40. The holes 75 are of a suitable diameter to receive the widest part of the clips. When the notches 38 in the clips are in register with the marginal edge of the holes, the clips are moved outwardly with the marginal edges of the holes received in the notches, to their outer limit position. The clips then form a solid and rigid connection with the holder as described above in connection with FIGURE 5.

Attention is next directed to FIGURES 8 and 9 showing a second embodiment of the invention. In the present case clips 76 are similar in all material respects to the clips 30 and are held together by a bolt 78 having a nut 80 thereon, with a spacer sleeve 82 surrounding the bolt between the clips and providing means limiting the drawing together of the clips.

A pair of kinves 84 are provided in the present instance, each having a shank or mounting portion 86. These mounting portions are provided with apertures together receiving a pin 88 having end portions 90 fitted in apertures in the extended ends of the clips 76, and a central bowed or crank portion 92. Upon rotation of the holder 22 the centrifugal force developed on the knives throws the bowed portion 92 outwardly and the latter acts as a self-centering means for the knives relative to the clips 76 whereby to properly position the series of knife assemblies along the holder 22 relative to each other.

The knives 84 have cutting portions 93 extending substantially perpendicular to the mounting portions 86. These cutting portions 93 are provided with cutting edges 94 presented in forward direction and are inclined upwardly and rearwardly, thereby presenting surfaces having a substantial component of extension in radial direction so that they produce a substantial air blast or steam as in the case of the first embodiment, and they also produce a self-cleaning effect. The trailing edges 95 of the cutting portions 93 are inclined from the outer ends of the cutting portions to the mounting portions 86, and this shape enhances the self-cleaning action.

The two knives 84 are free of positive connection with each other but rotate or swing together as a unit, and if only one of the knives should encounter an obstacle, the other knife will be able to continue swinging in normal direction and speed, with greater cutting efficiency than if both knives should be obstructed together.

FIGURE 10 shows a slight modification relative to that shown in FIGURES 8 and 9. In FIGURE 10 a U-shaped link 96 is utilized for directly supporting the knives 84. The link 96 has a central bight or loop 97 and legs 98 having eyelets 99 therein. The eyelets receive the same bolt 100 utilized for drawing the clips together.

Attention is next directed to FIGURES 11 and 12 showing a third embodiment of the invention. In the present instance the knife assembly includes a different form of means 102 for mounting the knives on the holder 22. The mounting means includes a pair of clips 104 which in the present instance are of round rod stock fitted in the holes 106 in the holder 22. The arrangement utilizes round holes 106 which are drilled in an inexpensive operation. The clips 104 include arcuate or bowed portions 108 and leg elements 110 provided with eyelets. The bowed portions 108 are provided with notches 112 on their interfacing sides. The clips are inserted in the holes until the notches 112 are in register with the connecting piece 116 between the holes and manipulated to fit the notches 112 over the connecting piece. In the present case also the clips are of spring steel and the elements are so arranged that when they are fitted in position as above described, stress is developed in the bowed portions 108 which biases those portions inwardly, establishing reaction points between the material ends 114 and the inner surface of the wall of the holder and between the notches 112 and the outer surface of the connecting piece 116.

Knives 118 of suitable kind are connected to the clips, these knives having mounting portions 120 fitted between the eyelets 110 and a bolt 122 is then fitted through the eyelets and apertures in the knives and fitted with a nut 124. The knives have cutting portions 126 extending outwardly from the mounting portions 120.

The reaction between the clips and the different points on the holder 22 provides a rigid and strong mounting means for the knives, notwithstanding the more limited dimension of the various elements in directions transverse to the holder 22 as compared with the previous embodiments. The present construction provides a very economical and inexpensive construction, the clips 104 being made from round rod stock which is relatively inexpensive

While we have disclosed and claimed herein certain preferred forms of the invention it will be understood that changes may be made therein within the spirit and scope of the appended claims.

We claim:

1. A flail knife assembly adapted for securement to a rotatable tubular holder having a surrounding wall, comprising, a pair of knives and means mounting the knives on the holder, the mounting means including a pair of resilient clips spaced apart a substantial distance along the axis of rotation of the holder, each clip having an arcuate portion at one end and a leg extending therefrom and having notches adjacent the arcuate portion, the arcuate portions being disposed in the interior of the holder with the legs extending outwardly therefrom through apertures in the wall, the notches and the marginal edge of the apertures forming interlocking conformations, the arcuate portions being so dimensioned and the notches in the clips being so positioned that the extended free ends of the arcuate portions engage the inner surface of the wall and this engagement together with the interlocking engagement at the notches and apertures produce biasing action on the legs of the clips away from each other, the mounting means also including a member drawing the outer ends of the legs toward each other whereby a fulcrum action is produced between the notches in the clips and the outer surface of the holder wall, producing biasing effect in the arcuate portions whereby the latter tends to arch radially inwardly of the holder and produce a rigid connection of the clips with the holder, said member being adapted for supporting knives thereon and the knives being movable therealong.

2. The invention set out in claim 1 in conjunction with knives pivotally supported in the mounting means on an axis extending in direction between the clips.

3. The invention set out in claim 1 wherein the clips are of substantial width, and the extended ends of the arcuate portions engage the inner surface of the wall of the holder throughout their width.

4. A flail knife assembly adapted for use with a tubular holder having a surrounding wall and adapted for rotation about its longitudinal axis comprising, in combination, mounting means including a pair of clips secured at one end in the holder and their other ends extending generally radially therefrom and spaced apart in the direction of the axis of rotation of the holder, the clips being of resilient material and the outer ends of the legs being biased apart in the direction of said axis, means secured to the outer ends of the clips and retaining them inwardly of their outermost biased position, and knives swingably suspended by the clips on an axis parallel with the axis of rotation of the holder, said apertures being round in shape and separated by a connecting piece, and the clips being round in cross section and of substantially lesser diameter than the apertures, and each of the clips having a single notch and the notches facing each other in the mounted position of the clips and receiving said connecting piece.

5. A flail knife assembly adapted for mounting on a holder comprising, a pair of knives having outer ends with cutting portions thereon, and means mounting the knives on the holder at the inner ends of the knives on an axis parallel with the axis of rotation of the holder, the mounting means including a pair of clips extending generally radially from the holder and spaced apart axially thereof, and means interconnecting said clips and suspending the knives thereby, the knives being movable along the suspending means in the direction of said axes, and the suspending means having a central portion that converges in direction generally radially outwardly of the holder, whereby to produce automatically self-centering of the knives relative to the mounting means in the direction of said axes, said means for suspending the knives including a pair of frusto-conical spools positioned with their small ends facing each other.

6. A flail knife assembly comprising a pair of knives each having a mounting portion and a cutting portion disposed at an angle to the mounting portion link means for suspending the knives, the knives being butted with their mounting portions in back-to-back relation and with the cutting portions extending outwardly from each other, each mounting portion having a notch extending in from one edge and having a closed inner end and the notches being arranged so that when the knives are in said back-to-back position the notches extend in opposite directions and their closed inner ends overlap and form a peripherally closed aperture, the link means being disposed in said aperture, and means interconnecting the knives in their mounting portions at a point spaced from said aperture.

7. The invention set out in claim 6 wherein the notches in the knives are inclined from said aperture outwardly and downwardly toward the cutting portions of the knives and the additional means interconnecting the knives is spaced from the aperture in direction toward the cutting portions of the knives.

8. A flail knife adapted for mounting on a rotatable holder and to assume a position relative to the holder generally radially thereof in response to rotation of the holder on its axis, said knife having a leading edge relative to its mounting on the holder and said rotation thereon, said knife including a longitudinal mounting portion having a proximte end by which the knife is mounted on the holder, and a cutting portion at the remote end of the mounting portion and lying closely adjacent a plane perpendicular to the longitudinal axis of the mounting portion, the mounting portion and cutting portion having leading and trailing edges corresponding to respective edges of the knife, the knife also including an intermediate portion interconnecting the mounting portion and the cutting portion and extending from a point adjacent the juncture of the leading edges of the cutting and mounting portions and receding to the trailing edges of the cutting and of the mounting portions, said intermediate portion diverging toward said trailing edge of the knife.

9. A flail knife having a longitudinal mounting portion and a cutting portion at a remote end of the mounting portion and extending at an angle thereto, said cutting portion having a leading cutting edge, and the knife having an intermediate portion interconnecting the mounting portion and the cutting portion and disposed at an angle to both the mounting and cutting portions.

References Cited

UNITED STATES PATENTS

| 2,974,888 | 3/1961 | Everett | 56—29 XR |
| 3,043,080 | 7/1962 | Mott | 56—294 |
| 3,122,871 | 3/1964 | Frevik et al. | 56—26 XR |
| 3,177,640 | 4/1965 | Mott | 56—504 |
| 3,252,276 | 5/1966 | Brewer | 56—289 |

ANTONIO F. GUIDA, *Primary Examiner.*